United States Patent
Clark et al.

(10) Patent No.: US 6,605,156 B1
(45) Date of Patent: Aug. 12, 2003

(54) ROBOTIC FLOOR CLEANING DEVICE

(75) Inventors: Alan Gerard Clark, Bristol (GB); David Lindsey Bisset, Chippenham (GB); Michael David Aldred, Chippenham (GB)

(73) Assignee: Dyson Limited, Wiltshire (GB)

(*) Notice: Subject to any disclaimer, the term of this patent is extended or adjusted under 35 U.S.C. 154(b) by 57 days.

(21) Appl. No.: 10/031,604

(22) PCT Filed: Jul. 20, 2000

(86) PCT No.: PCT/GB00/02815
§ 371 (c)(1),
(2), (4) Date: Jan. 23, 2002

(87) PCT Pub. No.: WO01/06904
PCT Pub. Date: Feb. 1, 2001

(30) Foreign Application Priority Data

Jul. 23, 1999 (GB) ............................................. 9917232

(51) Int. Cl.[7] .............................. B08B 5/04; B08B 7/04; A47L 5/00
(52) U.S. Cl. ............................... 134/6; 134/18; 134/21; 15/319; 15/340.3
(58) Field of Search ................................. 134/6, 21, 18, 134/42; 15/319, 340.1, 340.3, 340.4

(56) References Cited

U.S. PATENT DOCUMENTS 5,109,566 A * 5/1992 Kobayashi et al. ........... 15/319
5,341,540 A * 8/1994 Soupert et al. ............... 15/319
5,634,237 A   6/1997 Paranjpe
5,768,744 A * 6/1998 Hamilton .................... 15/340.1
5,940,927 A * 8/1999 Haegermarck et al. ....... 15/319

FOREIGN PATENT DOCUMENTS

| EP | 0 037 674 | 10/1981 |
| WO | WO 97/40734 | 11/1997 |
| WO | WO 99/28800 | 6/1999 |

* cited by examiner

Primary Examiner—Randy Gulakowski
Assistant Examiner—Saeed Chaudhry
(74) Attorney, Agent, or Firm—Morrison & Foerster LLP (57) ABSTRACT

A robotic floor cleaning device comprises a chassis (10), motor-driven wheels (11) supporting the chassis (10), a motor-driven suction fan (9), a dirty air inlet (2) and a motor-driven rotatable agitator (4) at the dirty air inlet (2) for agitating the surface. A control system navigates the device around a room and distributes power to the motor-driven wheels (11) and to the agitator (4). The control system detects when the agitator (4) has jammed (100, 102) and, in the event of a jam, attempts to clear the jam (104, 106). After successfully clearing the jam the control system turns the agitator (4) off (114, 116, 118) or navigates the cleaning device around the location at which the jam occurred (119). The cleaning device can store the location of the jam for use in preventing further jams when the cleaning device returns to a similar position in the room.

33 Claims, 6 Drawing Sheets

ROBOTIC FLOOR CLEANING DEVICE

FIELD OF THE INVENTION

This invention relates to a robotic floor cleaning device and to a method of operating such a device.

BACKGROUND OF THE INVENTION

Vacuum cleaners operate by having a fan unit which draws dirt-laden air through a dirty air inlet and then through a separating arrangement which separates the dirt from the air. Often the dirty air inlet will have a beater bar or brush roller which is rotated to agitate the floor covering and loosen the dirt so as to increase the amount of dirt and dust which is drawn into the cleaner via the dirty air inlet.

Robotic floor cleaning devices are known. Such devices can move around on a work surface according to a predetermined pattern or by random changes of direction of movement, cleaning the surface of dust and dirt as it travels. The device can be battery powered and will have a chassis, wheels to support the chassis, separate drive motors to drive the wheels, a suction fan, and a rotatable beater bar or brush roller. It is recognised that the rotating brush roller or beater bar can cause problems when there are loose carpet tassels or fringes and the like present on the floor because the tassels can become entangled with the brush roller or beater bar.

International Patent Application WO 97/40734 attempts to tackle this problem in an autonomous device having a brush roller. The device is programmed with a sequence so that, if there is an indication of the brush roller becoming jammed (which will often be due to the presence of a fringe or tassels), the brush roller motor is disconnected whereafter the motor is again transitorily switched on but in the opposite direction. This makes it possible for the carpet fringes to be unwound from the brush roller and fed out. When this reverse rotation step has been completed the brush roller motor is again stopped and thereafter the drive is reconnected so that the brush roller is rotated in the original direction of rotation.

It is stated in the aforementioned published application that in the normal case this would be sufficient for the release of the brush roller so that the normal cleaning function can be re-established. It is also stated that, should this not be the case, the disentanglement procedure will be repeated.

In the published application the drive current of the brush roller motor is sensed and compared with a limit value in order to detect whether the brush roller is jammed. If the limit is exceeded, the current driving the brush roller motor is first stopped and then applied in the opposite direction in order to rotate the brush roller in the reverse direction. When normal cleaning is to be resumed the motor current is again applied in the initial direction.

International Patent Application WO 99/28800 shows a robotic cleaner with a rotary brush where the brush is freed by cutting the power supply to the motor and performing a series of manoeuvres.

SUMMARY OF THE INVENTION

In both of these applications, manual intervention is required if the cleaner cannot successfully free the brush roller.

It is an object of the present invention to provide a robotic floor cleaning device which can more successfully cope with its environment.

According to the present invention there is provided a robotic floor cleaning device comprising a chassis, motor-driven wheels supporting the chassis, a motor-driven suction fan, a dirty air inlet, a motor-driven rotatable agitator at the dirty air inlet for agitating the surface to be cleaned, a control system for navigating the device around a room and for distributing power to the motor-driven wheels and to the agitator, the control system being arranged to operate the device in a first mode of operation in which power is supplied to the motor-driven wheels to move the device in a forward direction and power is supplied to the agitator, the control system further being arranged to detect when the agitator has jammed and, in the event of a jam, to attempt to clear the jam and after successfully clearing the jam to proceed in a second mode of operation.

In the second mode of operation, the control system can be arranged to turn off the agitator or to navigate the cleaning device around the position where the jam occurred. The cleaning device can remain in the second mode of operation for a preset distance or time or until some other condition is met.

By operating in a second mode of operation, the agitator is less likely to become jammed a second time, thus saving time and power which would otherwise be expended in carrying out the further attempts to clear the jam. Some environments where the cleaning device is operated may have obstacles such as rugs with tassels which cannot be negotiated with the agitator in use. By providing the second mode of operation, the cleaning device is better able to cope with these environments without manual intervention.

Preferably the cleaning device attempts to clear the jam by disconnecting the power to the agitator and then reversing the rotation of the motor-driven wheels of the device to move the device in a reverse direction.

A further aspect of the invention provides a robotic floor cleaning device comprising a chassis, motor-driven wheels supporting the chassis, a motor-driven suction fan, a dirty air inlet, a motor-driven rotatable agitator at the dirty air inlet for agitating the surface to be cleaned, a control system for navigating the device around a room and for distributing power to the motor-driven wheels and to the agitator, the control system being arranged to operate the device in a first mode of operation in which power is supplied to the motor-driven wheels to move the device in a forward direction and power is supplied to the agitator, to detect when the agitator has jammed and, in the event of a jam, to attempt to clear the jam and to store information representative of the location of the jam, the control system further being arranged to subsequently navigate the cleaning device around the room and to operate the device in a second mode of operation when the device approaches the location of a previous jam.

In the second mode of operation, the control system can turn off the agitator, navigate the cleaning device around the location where the agitator jammed or navigate the device so that the location at which the agitator became jammed is not overrun except from a direction different from the direction of first approach thereto.

By operating in a second mode of operation the before the jam location is reached, the agitator is less likely to become jammed a further time, thus saving time and power which would otherwise be expended in carrying out the further attempts to clear the jam.

Further preferable and advantageous features of the invention are set out in the subsidiary claims.

BRIEF DESCRIPTION OF THE DRAWINGS

In order that the invention may be more clearly understood, reference will now be made to the accompanying drawings, wherein.

DETAILED DESCRIPTION OF THE INVENTION

Figure 1:
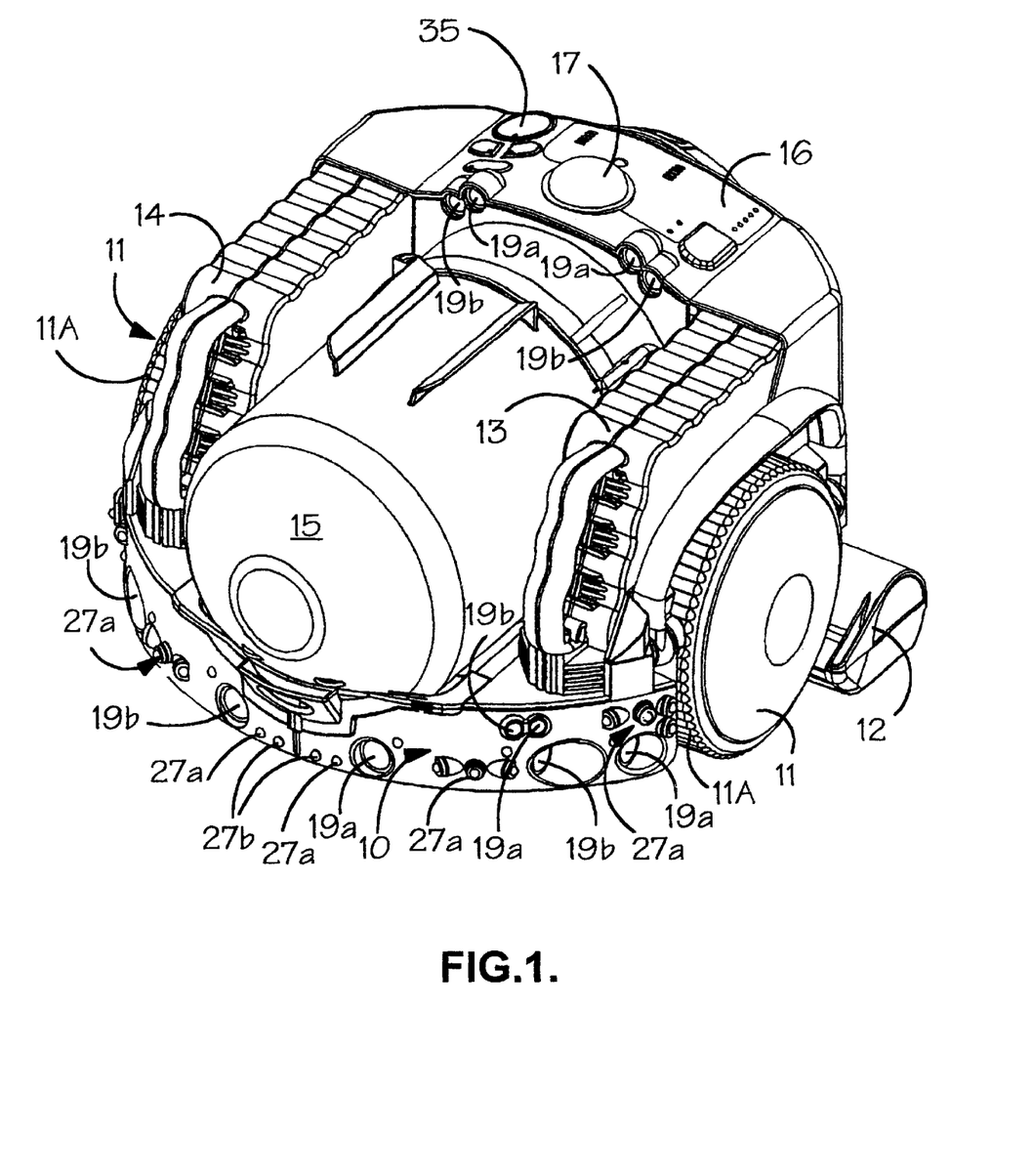
FIG. 1 is a perspective view of a robotic vacuum cleaner embodying the invention.

Referring firstly to FIG. 1 of the drawings, there is shown therein a robotic floor cleaning device in the form of a robotic vacuum cleaner comprising a chassis 10, two drive wheels 11, a brush bar housing 12, two rechargeable batteries 13 and 14, a cyclonic separator 15 of the type described in European Patent No. EP 042 723, a user interface 16, one (or more) light detectors 17 and various sensors 19 and 27 to 31 which will be more particularly described hereinafter. Each drive wheel 11 has an overmoulded ribbed tyre 11A of soft, rubbery plastic which gives a strong grip for driving the cleaner. The light detector 17 detects light received from a plurality of compass points around the vacuum cleaner and is more particularly described in our International Patent Application No. WO 00/38027. The details of the operation of the light detector 17 are not essential to the present invention and will not be described any further here.

Figure 2:
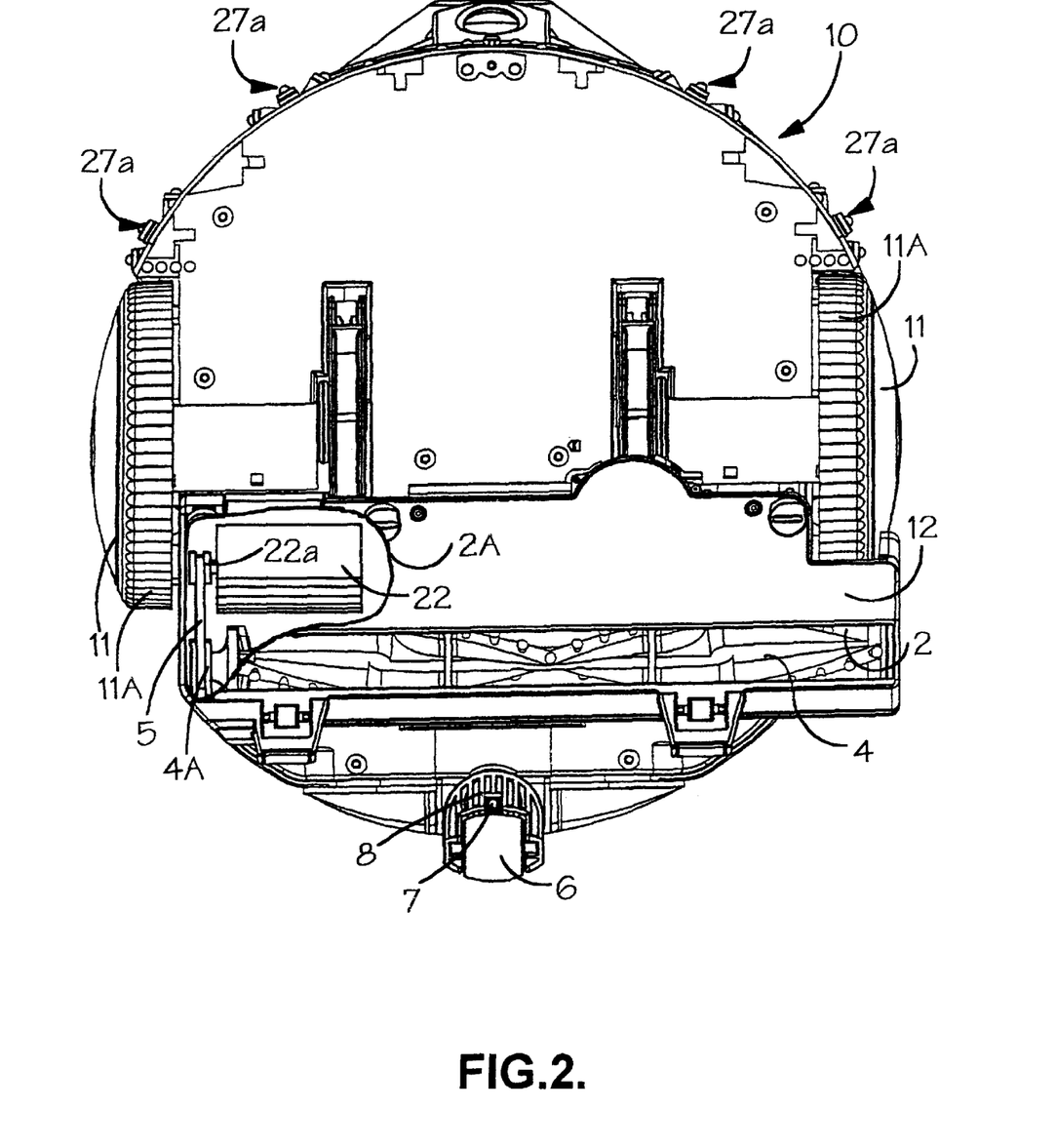
FIG. 2 is an underneath view of the cleaner in FIG. 1 with a small part cut away to show the brush bar motor and belt drive.

Referring to FIG. 2, mounted on the underside of the chassis 10 is a cleaner head 12 which includes a suction opening 2 facing the surface on which the cleaner is supported. The suction opening 2 is essentially rectangular and extends across the majority of the width of the cleaner head 12. A brush bar 4 is rotatably mounted in the suction opening 2. The cut-away portion 2A of the underside of the cleaner head 12 reveals the brush bar motor and drive arrangement within the cleaner head 12. A motor 22 is mounted in the cleaner head 12 for driving the brush bar 4 by way of a drive belt 5 extending between a shaft pulley 22A of the motor 22 and the pulley 4A of the brush bar 4. The cleaner head 12 is mounted on the chassis 10 in such a way that the cleaner head 12 is able to float on the surface to be cleaned. This is achieved by a mounting which includes double articulation between the cleaner head 12 and the chassis 10. The double articulation of the connection between the cleaner head 12 and the chassis 10 is more particularly described in our International Patent Application No. WO 00/36965. It allows the cleaner head 12 to move freely in a vertical direction with respect to the chassis 10. This enables the cleaner head 12 to climb over small obstacles such as books, magazines, rug edges etc. Obstacles of up to approximately 25 mm in height can be traversed in this way. A castor wheel 6 is located at the trailing edge of the chassis 10 and is swivellingly mounted on the chassis by means of a swivel joint 7. The castor wheel 6 also includes a ramped portion 8 which provides additional assistance when the cleaner encounters an obstacle and is required to climb over it. In this way, the castor wheel 6 will not become lodged against the obstacle after the drive wheels 11 have moved beyond it.

The cleaner head 12 is asymmetrically mounted on the chassis 10 so that one side of the cleaner head 12 protrudes beyond the general circumference of the chassis 10. This allows the cleaner to clean up to the edge of a room on the side of the cleaner on which the cleaner head 12 protrudes.

Figure 3:
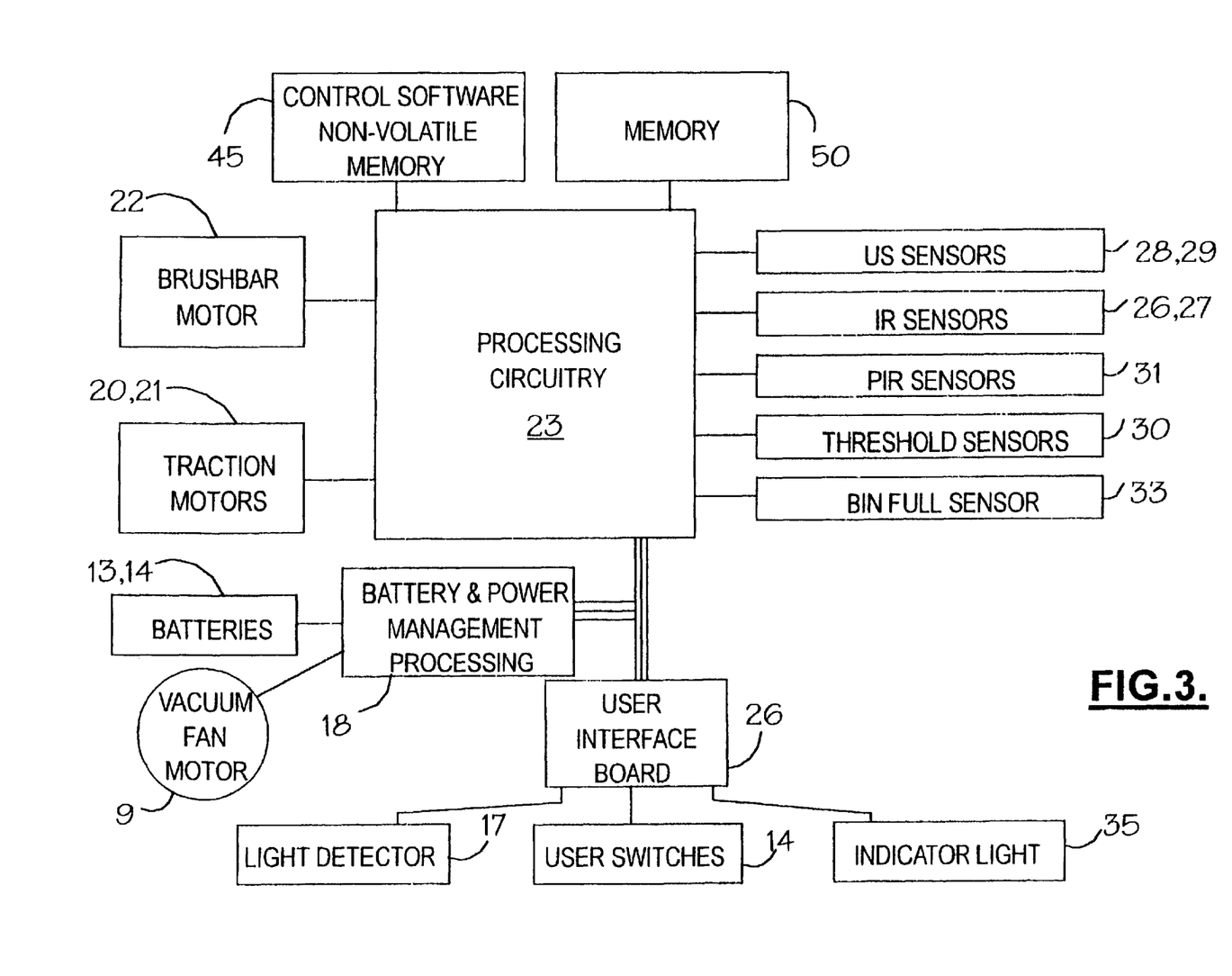
FIG. 3 is a block circuit diagram of the power management system and navigation system of the cleaner of FIG. 1.

The circuit shown in FIG. 3 comprises the two rechargeable batteries 13 and 14, a battery and motor management system 18, a motor and suction fan unit 9, motors 20 and 21 for driving the left and right hand wheels 11 of the vacuum cleaner, the motor 22 for driving the brush bar 4 of the vacuum cleaner, processing circuitry 23 (which includes a microprocessor and field programmable gate arrays) for a navigation system 34 (see FIG. 4), left and right hand sensor interfaces 24, 25 respectively, a user interface board 26 and the light detector 17.

The navigation system of the robotic vacuum cleaner includes a plurality of infrared sensors 27, a plurality of ultrasonic sensors 19, threshold detectors 30 for detecting the presence of a portable threshold locator (not shown) beyond which the robotic vacuum cleaner may not pass, and one or more pyroelectric detectors 31 for detecting animals and fires. The infrared sensors comprise infrared transmitters 27a and infrared receivers 27b and the ultrasonic sensors 19 comprise ultrasonic transmitters 19a and ultrasonic receivers 19b. There are four main ultrasonic receivers 19b which face forwards, rearwards and to opposite sides of the robotic vacuum cleaner. The signals received by these receivers 19b not only provide information representative of the distance of the robotic vacuum cleaner from a feature of the room or from an object in the room but also the amplitude and width of the received signals vary according to the size and shape of the feature or object and the type of material sensed.

Figure 4:
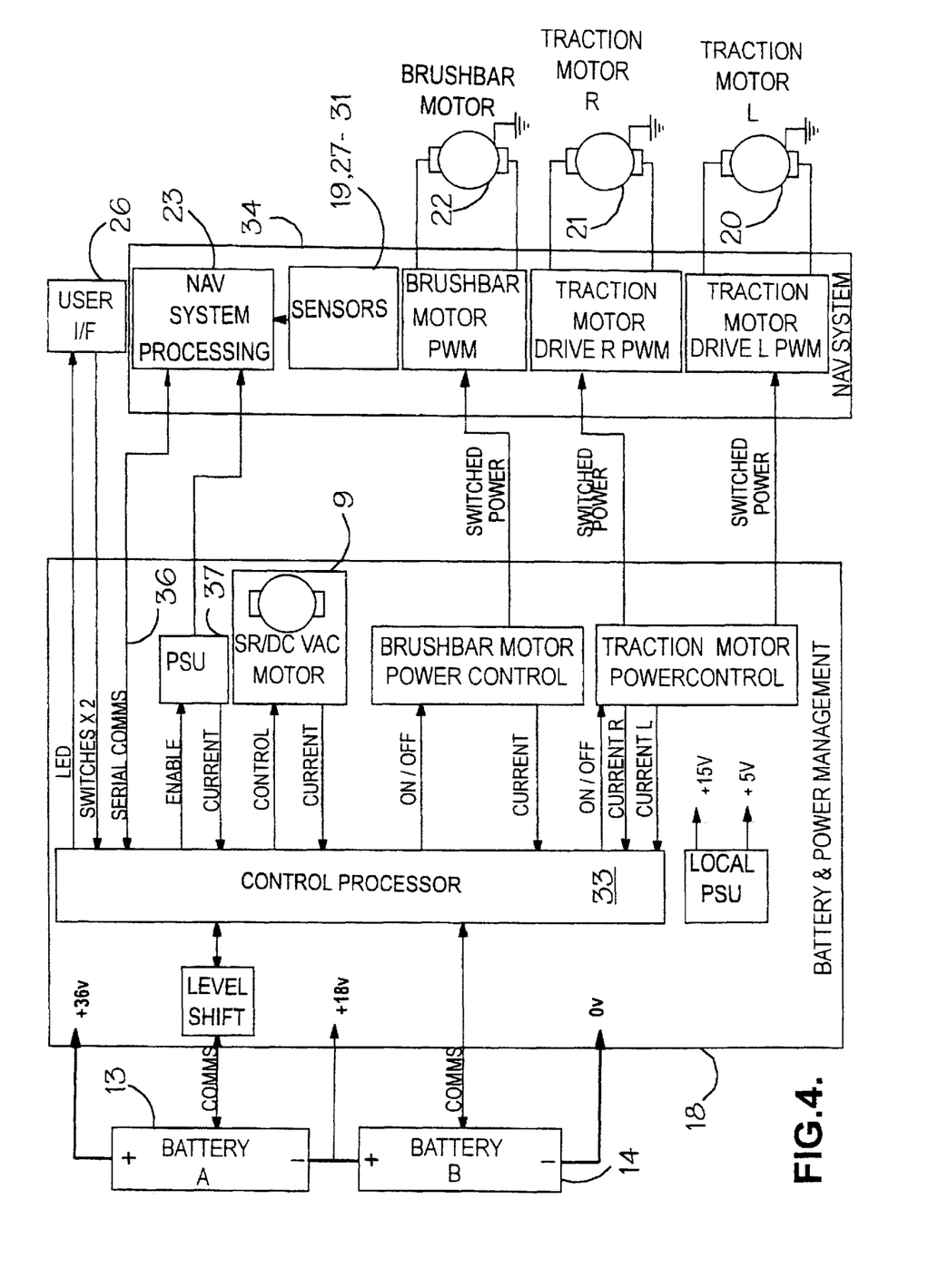
FIG. 4 is a more detailed block circuit diagram of the power management system shown in FIG. 3.

As shown in FIG. 4, the battery and motor management system 18 comprises a central processor 33 which receives data from battery monitors (not shown) in the rechargeable batteries 13, 14. The processor 33 calculates the charge remaining in the batteries 13, 14 and passes this information on to the processing circuitry 23 of the navigation system 34.

The central processor 33, typically a Hitachi H8/3334 F microprocessor, is connected to the user interface board 26 and supplies power to the navigation system 34 which includes the processing circuitry 23 and sensors 19 and 27 to 31. It also supplies power to the motors 20, 21 and 22 and the fan unit 9.

A switch 35 is located on the user interface 16 (see FIG. 1). The switch 35 interacts directly with the processor 33. Pressing the switch 35 a first time initiates a power down sequence which ultimately sets the processor 33 into an inactive state. Pressing the switch 35 a second time activates the processor 33 which then executes a power-up sequence to enable the robotic vacuum cleaner to be used for cleaning.

Communication lines 36 between the processor 33 and the navigation system 34 carry data relating to the batteries 13, 14, the fan unit 9 and the power supply 37 in one direction, and control information in the other direction.

The battery and motor management system 18 includes a power supply unit 37 for providing a regulated supply to the navigation system 34. The power supply unit 37 and the motors 20, 21 and 22 and fan unit 9 have current sensors (not shown) and these allow the processor 33 to monitor the current taken by the power supply unit 37 and the motors 20, 21 and 22 and the fan unit 9 and to shut down the relevant power supply if a predefined limit is exceeded. Information relating to the current taken by the motors 20 and 21 also provides an indication of the gradient and type of surface over which the vacuum cleaner is moving. The outputs from the current sensors are analogue signals. These are conditioned and then converted to digital values for subsequent processing by analogue-to-digital converters integrated into the processor 33 and communicated to the navigation system 34.

The traction and brush bar motors 20, 21 and 22 require pulse width modulation (PWM) speed control. The system therefore has three PWM generators capable of providing 0–100% PWM at >50 kHz with a resolution of 1/128. The PWM control of the motors 20, 21 and 22 is carried out in the navigation system 34.

The provision of two separate processing system 23 and 33 allows each system to carry out an integrity check on the respective other system and to shut down the vacuum cleaner if a fault is detected.

The particular method of operating and navigating the robotic vacuum cleaner is not a part of the present invention. Suffice it to say that the control and navigation system 34 will drive the cleaner around an area to be cleaned and the various sensors 19 and 27 to 31 will detect any portable threshold locators, obstacles in the room and other room features, such as corners of the room and fireplaces, and the processing circuitry 23 will navigate the robotic vacuum cleaner in order to avoid any such obstacles and to change direction when a corner of the room is reached. One particular operating method is described in more detail in our International Patent Application No. WO 00/38025. The navigation system therein described includes light detector apparatus. This allows the cleaner to locate itself in a room by identifying when the light levels detected by the light detector apparatus is the same as or substantially the same as the light levels previously detected by the light detector apparatus. The information received from the light detector apparatus in conjunction with information received from obstacle avoidance sensors is used to navigate the cleaner around the room. One aspect of the present invention makes use of the ability of the navigation system to locate the cleaner in the room and therefore the cleaner of the present invention can incorporate features of the cleaner described in WO 00/38025 which is incorporated herein by reference.

In one mode of operation, therefore, the robotic vacuum cleaner of the present invention is, typically, placed alongside a wall of a room to be cleaned and energised to move forwardly along the wall and so along the edge of the room. The various sensors 19, 27–31 will detect any obstacles in the room and other features, such as corners of the room and fireplaces, and the navigation system 34 will navigate the robotic vacuum cleaner in order to avoid any such obstacles and to change direction when a feature of a room is reached. At each change of direction (way point), the navigation system 34 will store information received from the light detector 17 and also from the ultrasonic receivers 19b in memory 50. It will also store information regarding the direction in which the cleaner is required to turn at each way-point. It will also periodically monitor the information received from the light detector 17 and the ultrasonic receivers 19b and compare this with information previously stored. When the robotic vacuum cleaner reaches a position in which the information received from the light detector 17 and the four main ultrasonic receivers 19b is the same or substantially the same as information previously stored, the navigation system 34 will determine that the robotic vacuum cleaner has completed a full traverse around the room. The navigation system 34 is programmed to cause the robotic vacuum cleaner to move inwardly by one cleaner-width or substantially one cleaner-width. The navigation system 34 will then be able to identify further way-points by comparing the information received from the light detector 17 and the four main ultrasonic receivers 19b with previously stored information and this will enable the robotic vacuum cleaner to navigate itself around the room in a generally inwardly spiral manner whilst simultaneously avoiding any obstacles in its path.

If the robotic vacuum cleaner is initially placed in the middle of the room, it will travel until it finds a wall or obstacle. If it finds a wall it will then follow the path described above. If it finds a feature (such as a central fireplace) or an obstacle in the centre of the room, it will complete a circuit around that feature or obstacle and then follow a generally outwardly spiral path, still avoiding obstacles as and when necessary.

Figure 5:
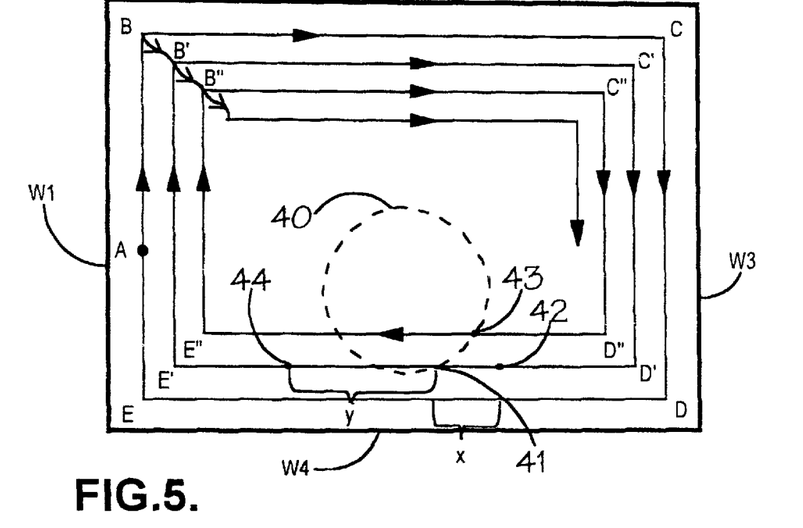
FIG. 5 is a schematic view illustrating operation of the cleaner of FIG. 1.

More specifically, if the vacuum cleaner starts from position A shown in FIG. 5 and moves along the edge of the room adjacent the first wall W1 in a clockwise direction, at position B it will sense the presence of the second wall W2 in front of it and will turn 90° to the right. It will already know from the sensors that there is a wall W2 on its left hand side. The cleaner will then continue until it reaches position C when it will sense the presence of the third wall W3 in front and will turn 90° to the right again to run along the side of the third wall W3. The cleaner is programmed to keep one side close to the nearest wall or obstacle or close to the most recently covered circuit of the room. Thus, when it reaches position D it will again turn right through 90° and follow the fourth wall W4 until it reaches position E when it will turn right again until it approaches position B again. At position B the light detector 17 and four main ultrasonic receivers 19b will detect information which is the same or substantially the same as they detected when the cleaner was previously at position B. At this point, the cleaner will move inwards by or substantially by one cleaner-width to position B' and will then continue to follow the initial traverse around the room, but one cleaner-width within that initial traverse. If obstacles are encountered by the cleaner during its movements around the room, the sensors 27–31 will detect them and the cleaner will navigate around them.

Information representative of the level of light detected at each way-point (each significant change of direction) will be stored in memory together with information from the four main ultrasonic receivers 19b. When the cleaner returns to similar way-points, e.g. way-points C',C"; D',D"; E',E"; etc., information on the two similar points will be associated with one another in memory in order to build up an information strand. This will tell the cleaner that it has returned to a known point and will also tell the cleaner when the floor of the room, apart from areas occupied by obstacles, has been cleaned.

Figure 6:
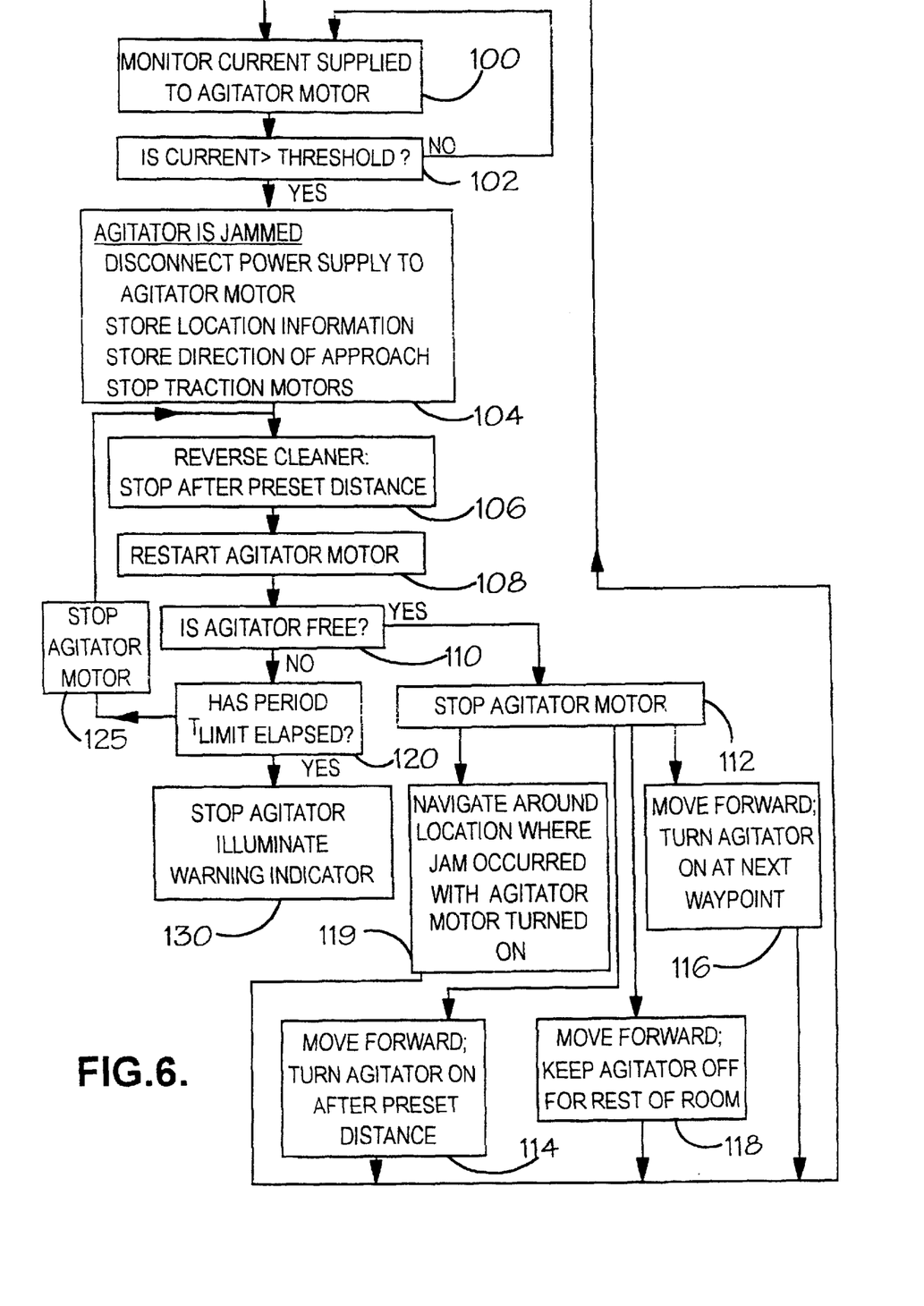
FIGS. 6 and 7 are flow charts showing the method of operation of the cleaner after the brush bar has become jammed.

The method of operation will now be described with reference to the example room layout shown in FIG. 5 and the flow diagram shown in FIG. 6. In FIG. 5, reference numeral 40 represents a circular rug having tassels around its edge. The microprocessor regularly monitors current supplied to the brushbar motor (step 100). Whilst making its second traverse around the room, the cleaner will encounter the tasselled edge of rug 40 at point 41. If the tassels are sufficiently long there is a risk of entanglement in the brush bar 4. If the tassels become entangled with the brush bar 4 the following disentanglement procedure takes place. The microprocessor 33, at step 102, will detect an increase in current supplied to the brush bar motor 22 indicative of a significant reduction in rotational speed of the brush bar 4. This in turn is indicative of a brush bar jam. The microprocessor 33 then sends a signal to the navigation system 34 which is programmed to disconnect the power to the brush bar motor 22 (step 104). The navigation system 34 will also identify point 41 as a "danger" way-point which is stored in the memory 50 together with information from the ultrasonic receivers 19*b*. The direction of approach to the point 41 is also stored in the memory 50. The navigation system 34 is programmed to stop the drive motors 20 and 21 and subsequently to drive them in reverse (step 106). The navigation system 34 monitors the sensors 19*b* located either at the front or at the rear of the cleaner to detect a change in the distance of the cleaner from wall W3 or W1. This confirms that the cleaner is moving and can also be used to determine when the cleaner has moved through a predetermined distance X to a point 42. As an example, X can be 20 cms, or a distance comparable with the length of the cleaner. At point 42 the navigation system 34 will stop the drive motors 20, 21 to bring the cleaner to a standstill. Subsequently, the navigation system 34 will re-start the motor 22 (step 108) and will assume that the brush bar is disentangled unless it receives a signal from the microprocessor 33 that the brush bar is still jammed or has again become jammed (step 110).

At this point the disentanglement sequence is complete. The navigation system 34 is programmed to then proceed in one of several alternative modes.

In the first mode the navigation system 34 will stop the brush bar 4 again (step 112) having regard for the "danger" way-point memorised for this location, but will otherwise continue to navigate the cleaner along the line D'–E' as shown in FIG. 5 until way-point E' is reached (step 116). At this point the brush bar 4 will be started again and will continue to rotate for the remainder of the cleaning programme unless interrupted by another entanglement e.g. at point 43. Thus under this mode the remaining portion of line D'–E' represents a cleaning track during which the suction fan 9 is operational but the brush bar motor 22 is not.

In the second mode the navigation system 34 is programmed to guide and drive the cleaner forward along the line D'–E' with the brush bar 4 switched off to a point 44 which lies a predetermined distance Y beyond the point 41 (step 114). The distance between points 42 and 44 is greater than the distance X by which the cleaner was moved backwards from point 41. The brush bar motor 22 is then switched on again to recommence rotation of the brush bar 4 when it is hoped that the cleaner is clear of the rug tassels. This distance is measured by the ultrasonic sensors 19 in the same way as distance X was measured. As an example, the forward distance could be twice the backwards distance X. The cleaner would then continue under the control of the navigation system 34 according to FIG. 5 along the remainder of line D'–E'. In this mode, only a relatively short distance (e.g. 40 cms) would be cleaned without the brush bar 4 turning.

In the third mode the navigation system 34 is programmed to continue cleaning the floor of the room according to the spiral pattern illustrated in FIG. 5 but with the brush bar motor 22 switched off for the remainder of the cleaning operation (step 118).

In the fourth mode of operation, subsequent to the disentanglement procedure described above being carried out, the navigation system 34 is programmed to proceed according to the spiral pattern illustrated in FIG. 5 but regarding the point 41 as an obstacle over which the cleaner may not pass (step 119). Thus, whenever the cleaner approaches or comes close to the point 41, the navigation system 34 will ensure that the cleaner does not pass directly over point 41 but navigates around it. It is, of course, possible that the new path of the cleaner will take it over another part of the edge of the tasselled rug 40 and a further danger way-point will be identified. This further way-point will be dealt with in the same way as the initial way-point.

Figure 7:
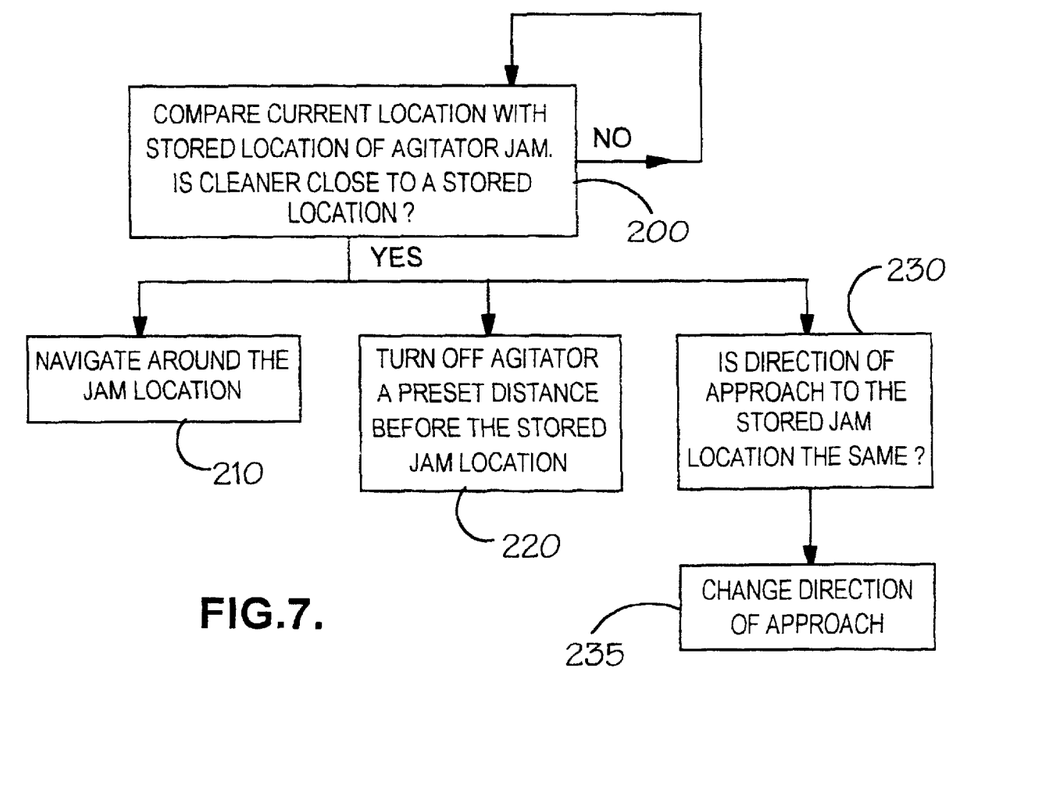

It is to be understood that the room shown in FIG. 5 has a simple layout and that, in reality, the room would contain furniture and other objects which the cleaner would navigate around. Thus the cleaner may be required to travel over the location 41 at which the brush bar 4 became jammed at another point in the cleaning operation. The flow diagram of FIG. 7 shows how the cleaner operates. At step 200, the navigation system 34 compares the current location with the stored list of locations where the brush bar has previously jammed. If the navigation system determines that the cleaner is close to one of stored locations, it can take one of several actions in an attempt to prevent a further brush bar jam. At step 210 the navigation system operates to navigate the cleaner around the location where the jam occurred. Alternatively, at step 220, the brush bar motor 22 may be switched off for a period of time immediately before and after the location 41 is overrun on each and every occasion that this occurs. Alternatively, at step 230, the cleaner compares the current direction of approach to the location where the jam occurred with the stored direction of approach and operates so to allow the cleaner to overrun location 41 as long as the direction of approach thereto is not the same as that when the brush bar 4 previously became jammed. Where the cleaner navigates around the room in a controlled manner with a regular pattern, such as the spiral pattern shown in FIG. 5, the cleaner will return to a similar position in the room on a subsequent lap of the room; e.g. positions 41 and 43. The comparison step 200 allows for a difference in position of at least the step distance between laps.

The brush bar 4 of the cleaner of FIGS. 1 to 5 is driven at around 300 rpm ±500 rpm (dependent upon the surface being cleaned) through a 2:1 reduction drive from the motor 22 which runs therefore at twice the speed of the brush bar 4. The drive coupling is an elastic belt and, when the motor is not energised, the brush bar 4 free wheels quite easily. We have found that by reversing the cleaner a short distance with the brush bar motor 22 switched off so that the brush bar 4 is able to free wheel, the tractive force of the drive wheels 1 on a normal floor is sufficient in most circumstances to disentangle the brush bar 4 from a carpet or rug tassel.

The brush bar motor 22 normally draws about 0.6 amps at 36 volts. This produces a motor torque of 40 mNm, around 80 mNm at the brush bar 4. If the current increases above 1.00 amp the navigation system 34 will trigger the entanglement procedure discussed above.

The drive motors 20 and 21 are coupled to the respective wheels 11 by reduction gearing (not shown) and provide a torque of 360 mNm. It is to be noted that the dirty air inlet 2 lies behind the drive wheels 11 in normal forward motion (towards the bottom left corner in FIG. 1). During rearward motion of the cleaner when disentangling a carpet tassel, the wheel grip will be increased due to the direction of tension force in any tassel that has been caught in the brush bar 4, thereby enhancing the tractive force available to move the cleaner backwards and thereby to disentangle the tassel.

It will be appreciated that the fact that the brush bar has jammed can be detected using means other than a current sensor as described above. Any sensor which will produce a signal to the microprocessor 33 when the brush bar slows to a stop or a virtual stop will achieve the same effect as the current sensing device mentioned above. For example, infrared sensors arranged in the vicinity of the brush bar can be used in a known manner to sense the rotational speed of the brush bar and a signal can be sent to the microprocessor when the speed falls below a preset value. While the control system is described here as storing sensor information such as light sensor and ultrasonic sensor measurements which are indicative of a location in a room, actual location information could also be stored. Other variations and modifications to the specific features of the embodiment described above will be apparent to a skilled reader.

What is claimed is:

1. A robotic floor cleaning device comprising a chassis, motor-driven wheels supporting the chassis, a motor-driven suction fan, a dirty air inlet, a motor-driven rotatable agitator at the dirty air inlet for agitating the surface to be cleaned, a control system for navigating the device around a room and for distributing power to the motor-driven wheels and to the agitator, the control system being arranged to operate the device in a first mode of operation in which power is supplied to the motor-driven wheels to move the device in a forward direction and power is supplied to the agitator, the control system further being arranged to detect when the agitator has jammed and, in the event of a jam, to attempt to clear the jam and after successfully clearing the jam to proceed in a second mode of operation.

2. A cleaning device according to claim 1 wherein, in the event of a jam, the control system is arranged to disconnect the power to the agitator and to reverse the rotation of the motor-driven wheels of the device to move the device in a reverse direction.

3. A cleaning device according to claim 2, wherein the device is arranged to move in a reverse direction over a preset distance.

4. A cleaning device according to claim 3, wherein the preset distance is measured by sensing the change in distance of the device from an object or wall in the room being cleaned while moving the device in a reverse direction.

5. A cleaning device according to claim 4, wherein the distance of the device from an object or wall in the room being cleaned is sensed ultrasonically.

6. A cleaning device according to claim 2, wherein the cleaning device is arranged to reconnect the power to the agitator subsequent to moving in a reverse direction.

7. A cleaning device according to claim 2, wherein the cleaning device is arranged to move in a forwards direction subsequent to moving in a reverse direction.

8. A cleaning device according to claim 1, wherein, in the second mode of operation, the control system is arranged to turn off the agitator.

9. A cleaning device according to claim 8 wherein the control system is arranged to maintain the cleaning device in the second mode of operation for a preset distance.

10. A cleaning device according to claim 8 wherein the control system is arranged to maintain the cleaning device in the second mode of operation for a preset period of time.

11. A cleaning device according to claim 8 wherein the control system, in use, stores information representative of positions in the area in which the device is operating and wherein the control system is arranged to maintain the cleaning device in the second mode of operation until the cleaning device reaches the next stored position.

12. A cleaning device according to claim 1, wherein, in the second mode of operation, the control system is arranged to navigate the cleaning device around the location where the agitator jammed.

13. A cleaning device according to claim 1, wherein the cleaning device is arranged to memorize the location of the device at which the agitator became jammed.

14. A cleaning device according to claim 13, wherein the cleaning device is arranged to memorize the direction of approach of the device to the location at which the agitator became jammed.

15. A cleaning device according to claim 14, wherein the cleaning device is arranged to subsequently proceed to clean the floor while navigating the device so that the location at which the agitator became jammed is not overrun except from a direction different from the direction of first approach thereto.

16. A cleaning device according to claim 13, wherein the cleaning device is arranged to subsequently proceed to clean the floor while navigating so that, if the location at which the agitator became jammed is overrun, power to the agitator is disconnected just before the device arrives at that location.

17. A cleaning device according to claim 16, wherein the distance before the said location is preset.

18. A cleaning device according to claim 16, wherein the control system is arranged to reconnect power to the agitator after the location at which the agitator became jammed has been overrun.

19. A cleaning device according to claim 18, wherein the control system is arranged to reconnect power to the agitator after the device has overrun the said location by a preset distance.

20. A cleaning device according to claim 19, wherein the preset distance is measured by ultrasonic sensors on the device.

21. A cleaning device according to claim 18, wherein the power to the agitator is reconnected when the device next reaches a way point.

22. A cleaning device according to claim 13, wherein the control system is arranged to proceed to clean the floor whilst navigating the device so that, if the location at which the agitator became jammed is approached, the said location is treated as an obstacle and overrun thereof is avoided.

23. A cleaning device according to claim 1, wherein, if the agitator becomes jammed a predetermined number of times, the control system is arranged to disconnect power to the agitator and the device continues cleaning the floor while the agitator remains disconnected.

24. A cleaning device according to claim 1, wherein the device has a warning indicator and, if the agitator remains jammed after a predetermined time has elapsed after the first detection of an agitator jam, the warning indicator is activated.

25. A cleaning device according to claim 1, wherein the control system is arranged to monitor when the rotational speed of the agitator falls below a threshold indicative of an agitator jam.

26. A cleaning device according to claim 25, wherein the speed of the agitator is sensed by sensing the current drawn by the agitator motor.

27. A method of operating a robotic floor cleaning device comprising a chassis, motor-driven wheels supporting the chassis, a motor-driven suction fan, a dirty air inlet, a motor-driven rotatable agitator at the dirty air inlet for agitating the surface to be cleaned, and a control system for navigating the device around a room and for distributing power to the motor-driven wheels and to the agitator, the method comprising the control system operating the device in a first mode of operation in which power is supplied to the motor-driven wheels to move the device in a forward direction and power is supplied to the agitator, detecting when the agitator has jammed and, in the event of a jam, attempting to clear the jam and after successfully clearing the jam proceeding to operate in a second mode of operation.

28. A robotic floor cleaning device comprising a chassis, motor-driven wheels supporting the chassis, a motor-driven suction fan, a dirty air inlet, a motor-driven rotatable agitator at the dirty air inlet for agitating the surface to be cleaned, a control system for navigating the device around a room and for distributing power to the motor-driven wheels and to the agitator, the control system being arranged to operate the device in a first mode of operation in which power is supplied to the motor-driven wheels to move the device in a forward direction and power is supplied to the agitator, to detect when the agitator has jammed and, in the event of a jam, to attempt to clear the jam and to store information representative of the location of the jam, the control system further being arranged to subsequently navigate the cleaning device around the room and to operate the device in a second mode of operation when the device approaches the location of a previous jam.

29. A cleaning device according to claim 28 wherein, in the second mode of operation, the control system is arranged to turn off the agitator.

30. A cleaning device according to claim 29 wherein the control system is arranged to maintain the cleaning device in the second mode of operation for a preset distance.

31. A cleaning device according to claim 29 wherein the control system is arranged to maintain the cleaning device in the second mode of operation for a preset period of time.

32. A cleaning device according to claim 28 wherein, in the second mode of operation, the control system is arranged to navigate the cleaning device around the location where the agitator jammed.

33. A cleaning device according to claim 28, wherein the cleaning device is arranged to also memorize the direction of approach of the device to the location at which the agitator became jammed and wherein, in the second mode of operation, the control system is arranged to navigate the device so that the location at which the agitator became jammed is not overrun except from a direction different from the direction of first approach thereto.

* * * * *

UNITED STATES PATENT AND TRADEMARK OFFICE
CERTIFICATE OF CORRECTION

PATENT NO. : 6,605,156 B1  Page 1 of 1
DATED : August 12, 2003
INVENTOR(S) : Alan Gerard Clark et al.

It is certified that error appears in the above-identified patent and that said Letters Patent is hereby corrected as shown below:

<u>Title page,</u>
Item [57], ABSTRACT, please replace the whole ABSTRACT with the following new ABSTRACT.

A robotic floor cleaning device includes a chassis, motor-driven wheels supporting the chassis, a motor-driven suction fan, a dirty air inlet and a motor-driven rotatable agitator at the dirty air inlet for agitating the surface of the floor to be cleaned, for example. A control system navigates the device around a room and distributes power to the motor-driven wheels and to the agitator. The control system detects when the agitator has jammed and, in the event of a jam, attempts to clear the jam. After successfully clearing the jam the control system turns the agitator off or navigates the cleaning device around the location at which the jam occurred. The cleaning device can store the location of the jam for use in preventing further jams when the cleaning device returns to a similar position in the room.

Signed and Sealed this

Twenty-seventh Day of January, 2004

JON W. DUDAS
*Acting Director of the United States Patent and Trademark Office*